(12) United States Patent
Destura et al.

(10) Patent No.: US 9,990,843 B2
(45) Date of Patent: Jun. 5, 2018

(54) REMOTE CONTROLLED DEVICE AND A REMOTE CONTROL FOR CONTROLLING MULTIPLE REMOTE CONTROLLED DEVICES

(71) Applicant: KONINKLIJKE PHILIPS N.V., Eindhoven (NL)

(72) Inventors: Galileo June Adeva Destura, Eindhoven (NL); Erik Witberg, Eindhoven (NL); Man Shing Wong, Eindhoven (NL); Arjen Van Der Linden, Schaijk (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days. days.

(21) Appl. No.: 15/320,762

(22) PCT Filed: May 9, 2016

(86) PCT No.: PCT/EP2016/060257
§ 371 (c)(1),
(2) Date: Dec. 21, 2016

(87) PCT Pub. No.: WO2016/184706
PCT Pub. Date: Nov. 24, 2016

(65) Prior Publication Data
US 2018/0075737 A1    Mar. 15, 2018

(30) Foreign Application Priority Data

Feb. 21, 2015  (EP) .................................... 15168752

(51) Int. Cl.
*H04B 10/00*  (2013.01)
*G08C 23/04*  (2006.01)
*H04W 8/00*  (2009.01)

(52) U.S. Cl.
CPC ............ *G08C 23/04* (2013.01); *H04W 8/005* (2013.01); *G08C 2201/20* (2013.01); *G08C 2201/30* (2013.01); *G08C 2201/50* (2013.01)

(58) Field of Classification Search
CPC ................ G08C 23/04; G08C 2201/20; G08C 2201/30; G08C 2201/50; G08C 17/02;
(Continued)

(56) References Cited

U.S. PATENT DOCUMENTS 8,390,746 B2 * 3/2013 Tsurumoto ........... H04N 5/4403
                                                    348/552
9,106,337 B2 * 8/2015 Jung ................... H04B 10/1141
(Continued)

*Primary Examiner* — Hibret Woldekidan

(57) ABSTRACT

By transmitting a remote controlled device identifier through an optical signal emitted by a remote controlled device to a remote control pointed at the remote controlled device, the remote control is able to address the remote controlled device via a communication network and be paired with the remote controlled device. As the remote control just has to be pointed at the remote controlled device that is to be paired the pairing is intuitive. A verification unit can be added to the remote controlled device that transmits a challenge via the optical signal to the remote control. The remote control creates a response and transmits the response to the remote controlled device for verification by the verification unit. If the verification is successful the pairing is allowed. As the challenge can only be extracted from the optical signal, access to the room in which the remote controlled device is locate dis required in order to gain control over the remote controlled device. A hack solely over the communication network is prevented as the challenge is not available on the communication network.

15 Claims, 6 Drawing Sheets

(58) Field of Classification Search
CPC ............ G08C 2201/32; G08C 2201/70; G08C 2201/91; G08C 2201/93; G08C 2201/21; G08C 2201/40; H04W 8/005; H04B 5/0062; H04B 5/02; H04B 10/1143
USPC ........ 398/106, 107, 108, 109, 110, 111, 112, 398/113, 114
See application file for complete search history.

(56) References Cited

U.S. PATENT DOCUMENTS

| | | | |
|---|---|---|---|
| 9,412,265 B2* | 8/2016 | Pratt | G08C 17/02 |
| 9,454,251 B1* | 9/2016 | Guihot | G08C 17/02 |
| 9,801,008 B2* | 10/2017 | Zhu | H04W 4/008 |
| 9,837,049 B2* | 12/2017 | Matsukawa | G09G 5/12 |
| 2004/0070516 A1* | 4/2004 | Nielsen | G07C 9/00309 340/12.22 |
| 2007/0195195 A1* | 8/2007 | Hicks | G08C 17/02 348/552 |
| 2008/0169907 A1* | 7/2008 | Ootsuka | G08C 17/02 340/10.1 |
| 2008/0253772 A1* | 10/2008 | Katsuyama | G08C 17/02 398/106 |
| 2010/0053462 A1* | 3/2010 | Candelore | H04N 5/4403 348/734 |
| 2010/0317332 A1* | 12/2010 | Bathiche | H04B 1/202 455/418 |
| 2011/0018754 A1* | 1/2011 | Tojima | G08C 17/00 341/176 |
| 2014/0064736 A1* | 3/2014 | Manabe | G08C 23/04 398/107 |
| 2016/0125733 A1* | 5/2016 | Sallas | G08C 23/04 398/106 |
| 2016/0286631 A1* | 9/2016 | Wan | H05B 37/0272 |

* cited by examiner

REMOTE CONTROLLED DEVICE AND A REMOTE CONTROL FOR CONTROLLING MULTIPLE REMOTE CONTROLLED DEVICES

CROSS-REFERENCE TO PRIOR APPLICATIONS

This application is the U.S. National Phase application under 35 U.S.C. § 371 of International Application No. PCT/EP2016/060257, filed on May 9, 2016, which claims the benefit of European Patent Application No. 15168752.2, filed on May 21, 2015. These applications are hereby incorporated by reference herein.

FIELD OF THE INVENTION

This invention relates to a remote controlled devices and a remote control able to control multiple remote controlled devices.

BACKGROUND OF THE INVENTION

Having to use a separate remote control for each remote controlled device in the house results in multiple remote controls lying around and the user having to select the proper remote control for the device to be controlled. To overcome this, remote controls have been developed that can be programmed to support multiple devices and emit after selecting the device to be controlled through buttons on the remote control the proper codes for the selected device.

Because of increased complexity in a smart home environment wherein multiple devices are to be controlled, remote controls often employ a radio frequency connection for data transmission to and from the remote controlled device.

Using a radio frequency connection requires the pairing of the remote control and the remote controlled device. The challenge of being able to properly pair the multitude of RF controlled apparatus to the said remote control is a daunting task to a layman.

The Nintendo Wii game console is an example of such a remote control and remote controlled system where the remote control requires pairing to the game console.

To achieve this pairing a button is to be pressed simultaneously on the game console and the remote control, indicating both the request to pair the devices and at the same time indicating which devices are to be paired: the devices having their buttons simultaneously pressed.

Having to press the button on both remote control and remote controlled device is cumbersome.

Patent application publication US 2014/0064736 A1 discloses an information processing apparatus that includes a light-receiving section capable of receiving an optical signal emitted from another apparatus, a controller capable of acquiring identification information for identifying the other apparatus on a network based on the received optical signal, and a communication section capable of establishing a connection with the other apparatus based on the acquired identification information.

Document US 2010/0317332 A1 relates to a mobile device such as a cell phone used to remotely control an electronic appliance such as a television or personal computer. In a setup phase, the mobile device captures an image of the electronic appliance and identifies and stores scale-invariant features of the image. A user interface configuration such as a virtual keypad configuration, and a communication protocol, can be associated with the stored data. Subsequently, in an implementation phase, another image of the electronic appliance is captured and compared to the stored features in a library to identify a match. In response, the associated user interface configuration and communication protocol are implemented to control the electronic appliance. In a polling and reply process, the mobile device captures a picture of a display of the electronic device and compares it to image data which is transmitted by the electronic appliance.

It is the objective of the present invention to overcome this disadvantage and allow easy pairing of remote controls and remote controlled devices.

It is a further objective of the present invention to prevent unauthorized access of a remote control to the remote controlled devices.

SUMMARY OF THE INVENTION

The objectives of the present invention are solved by the user interaction system of claim 1, the remote control of claim 7, and the remote controlled device of claim 13. Advantageous embodiments are defined in the dependents claims.

A remote control according to the invention is characterized in that the remote controlled device is arranged to emit an remote controlled device identifier through the optical emitter, and the remote control is arranged to receive the remote controlled device identifier through the optical detector and that the remote control and/or remote controlled device are arranged to set up the communication channel using the remote controlled device identifier.

By transmitting the remote controlled device identifier through the optical emitter and optical receiver the pairing over the other communication channel such as a wireless connection is simplified as for the remote controlled device identifier to be received, the remote control just has to be pointed at the remote controlled device that is to be paired. This makes the selection of which devices are to be paired intuitive. As the optical receiver of the remote, for instance a camera build into the front of the remote control, has a limited angle of view, only signals emitted by a device within this limited angle will be received, and thus only the remote controlled device identifier of the device the remote is pointed at will be received. Having the remote controlled device identifier, the remote control and the remote controlled device are able to pair. The user no longer needs to operate buttons on both devices simultaneously in order to pair them as was required before.

In an embodiment of the user interaction system the remote controlled device identifier is a unique address within a set of remote controlled devices.

As long as the address is unique within the set of remotely controlled devices the remote controller can identify the remote controlled device that the remote control is to be paired with and initiate the pairing procedure.

In a further embodiment of the user interaction system the address is a MAC address.

A media access control address (MAC address) is a unique identifier assigned to a network interface for communications on the physical network segment. MAC addresses are most often assigned by the manufacturer of a network interface controller (NIC) and are stored in its hardware and are unique for the device that comprises that network interface. On broadcast networks, such as wireless networks, the MAC address uniquely identifies each node on that segment and allows frames to be marked for specific hosts. It thus forms the basis of most of the link layer (OSI Layer 2) networking upon which upper layer protocols rely to produce complex, functioning networks. The remote control can use the MAC address received from the (to be) remote controlled device to communicate with the remote controlled device In an embodiment of the system the remote control automatically initiates a pairing action to a remote controlled device that is both in view of the remote control's optical detector and is in pairing mode.

After receiving the remote controlled device identifier/address via the optical receiver the remote control can communicate with the remote controlled device and establish whether the remote controlled device is in pairing mode. If that is the case the pairing is performed.

No other interaction besides pointing the remote control at the remote controlled device is need from the user as the pairing can be performed automatically having the remote controlled device identifier, for instance its MAC address, available.

In a further embodiment of the system the remote control automatically initiates a pairing action to a remote controlled device that is both in view of the remote controls optical detector and is unpaired.

After receiving the remote controlled device identifier/address via the optical receiver the remote control can communicate with the remote controlled device and establish whether the remote controlled device is unpaired. If that is the case the pairing is performed and the remote control becomes the first remote control to be paired with the remote controlled device.

No other interaction besides pointing the remote control at the remote controlled device is need from the user as the pairing can be performed automatically having for instance the MAC address available so the remote controlled device can be addressed via the communication channel.

In a further embodiment of the system the system is arranged to pair a second remote control to the remote controlled device by initiating a cloning process from a paired remote control to the second remote control.

By cloning the data in a first remote control to a second remote control, the second remote control does not need to be individually pointed at each remote controlled device that the first remote control was paired with, saving the user a lot of work.

Cloning for instance the MAC addresses that the first remote control received from the remote controlled devices to be paired with allows the second remote control to also, without further user interaction, pair with the same remote controlled devices in individual paring processes. By cloning all data in the first remote control, the second remote control can be used instead of the first control as the remote controlled devices can no longer distinguish between the two remote controls and will consider the second remote control to be paired and accept data from this remote control as well.

In an embodiment of the system the remote controls are arranged to duplicate data changes in a first remote control to a second remote control.

When changing data in a first remote for instance by pairing it to a particular remote controlled device, the second remote control updates the same data in the same way as it was changed in the first remote control. This ensures that when adding for instance a remote controlled device the user only needs to pair it with a single remote control, after which, after duplicating this changed data to other remote controls, the other remote controls will be paired with the newly added remote controlled device as well.

In a further embodiment where the remote controlled device comprises a verification unit arranged to transmit a challenge information to the remote control via the optical emitter, where the remote control is arranged to enter into a pairing mode after receiving the challenge information via the optical detector and to transmit a response information back to the remote controlled device via the communication channel for verification of the response by the remote controlled device and where the remote controlled device is further arranged to enter into pairing mode after a positive verification.

The verification of identity of the remote control allows the remote controlled devices to prevent unauthorized access to the remote controlled device if the response by the remote control to the challenge provided by the remote controlled device fails verification. By sending this challenge via the optical emitter of the remote controlled device and receiver of the remote control it becomes very difficult to obtain unauthorized access to the remote controlled device when having only access to the other communication channel. Physical access is required to receive the challenge as the challenge is only transmitted vie an optical signal and not available via the communication network.

A remote control according to the invention is arranged to receive a remote controlled device identifier from the remote controlled device through the optical detector and that the remote control is arranged to set up the communication channel using the remote controlled device identifier.

After receiving the remote controlled device identifier/address via the optical receiver the remote control can communicate with the remote controlled device and establish whether the remote controlled device is in pairing mode. If that is the case the pairing is performed.

No other interaction besides pointing the remote control at the remote controlled device is need from the user as the pairing can be performed automatically having the remote controlled device identifier, for instance its MAC address, available.

In an embodiment of the remote control the remote controlled device identifier is a unique address within a set of remote controlled devices.

As long as the address is unique within the set of remotely controlled devices the remote controller can identify the remote controlled device that the remote control is to be paired with and initiate the pairing procedure.

In a further embodiment of the remote control the address is a MAC address. A media access control address (MAC address) is a unique identifier assigned to a network interface for communications on the physical network segment. MAC addresses are most often assigned by the manufacturer of a network interface controller (NIC) and are stored in its hardware and are unique for the device that comprises that network interface. On broadcast networks, such as wireless networks, the MAC address uniquely identifies each node on that segment and allows frames to be marked for specific hosts. It thus forms the basis of most of the link layer (OSI Layer 2) networking upon which upper layer protocols rely to produce complex, functioning networks. The remote control can use the MAC address received from the (to be) remote controlled device to communicate with the remote controlled device.

In a further embodiment the remote control automatically initiates a pairing action to a remote controlled device that is both in view of the remote control's optical detector and is in pairing mode.

After receiving the remote controlled device identifier/address via the optical receiver the remote control can communicate with the remote controlled device and establish whether the remote controlled device is in pairing mode. If that is the case the pairing is performed.

No other interaction besides pointing the remote control at the remote controlled device is need from the user as the pairing can be performed automatically having the remote controlled device identifier, for instance its MAC address, available.

In a further embodiment the remote control automatically initiates a pairing action to a remote controlled device that is both in view of the remote control's optical detector and is unpaired.

After receiving the remote controlled device identifier/address via the optical receiver the remote control can communicate with the remote controlled device and establish whether the remote controlled device is unpaired. If that is the case the pairing is performed and the remote control becomes the first remote control to be paired with the remote controlled device.

No other interaction besides pointing the remote control at the remote controlled device is need from the user as the pairing can be performed automatically having for instance the MAC address available so the remote controlled device can be addressed via the communication channel.

In a further embodiment the remote control is arranged to initiate a cloning process from the remote control to a second remote control.

By cloning the data in a first remote control to a second remote control, the second remote control does not need to be individually pointed at each remote controlled device that the first remote control was paired with, saving the user a lot of work. Cloning for instance the MAC addresses that the first remote control received from the remote controlled devices to be paired with allows the second remote control to also, without further user interaction, pair with the same remote controlled devices in individual paring processes. By cloning all data in the first remote control, the second remote control can be used instead of the first control as the remote controlled devices can no longer distinguish between the two remote controls and will consider the second remote control to be paired and accept data from this remote control as well.

In a further embodiment the remote controls are arranged to duplicate data changes in the remote control to a second remote control.

When changing data in a first remote for instance by pairing it to a particular remote controlled device, the second remote control updates the same data in the same way as it was changed in the first remote control. This ensures that when adding for instance a remote controlled device the user only needs to pair it with a single remote control, after which, after duplicating this changed data to other remote controls, the other remote controls will be paired with the newly added remote controlled device as well.

In a further embodiment the remote control is arranged to enter into a pairing mode after receiving a challenge information via the optical detector and to transmit a response information back to the remote controlled device via the communication channel for verification of the response by the remote controlled device and is further arranged to pair with the remote controlled device after a positive verification of the response by the remote controlled device.

The verification of identity of the remote control allows the remote controlled devices to prevent unauthorized access to the remote controlled device if the response by the remote control to the challenge provided by the remote controlled device fails verification. By sending this challenge via the optical emitter of the remote controlled device and receiver of the remote control it becomes very difficult to obtain unauthorized access to the remote controlled device when having only access to the other communication channel.

A remote controlled device according to the invention is arranged to emit a remote controlled device identifier through the optical emitter to the remote control to enable the remote control to set up the communication channel using the remote controlled device identifier.

By transmitting the remote controlled device identifier through the optical emitter and optical receiver the pairing over the other communication channel such as a wireless connection is simplified as for the remote controlled device identifier to be received, the remote control just has to be pointed at the remote controlled device that is to be paired. This makes the selection of which devices are to be paired intuitive. As the optical receiver of the remote, for instance a camera build into the front of the remote control, has a limited angle of view, only signals emitted by a device within this limited angle will be received, and thus only the remote controlled device identifier of the device the remote is pointed at will be received. Having the remote controlled device identifier, the remote control and the remote controlled device are able to pair. The user no longer needs to operate buttons on both devices simultaneously in order to pair them as was required before.

In an embodiment of the remote controlled device the remote controlled identifier is a unique address within a set of remote controlled devices. Such a unique address is for instance a MAC address. It allows the pairing to be direct to the proper remote controlled device over the non-optical communication channel.

In an embodiment remote controlled device is arranged to enter pairing mode when emitting the remote controlled device identifier.

By entering pairing mode once the remote controlled device identifier is being emitted the remote controlled device is ready to pair with the remote control without further user interaction.

In an embodiment the remote controlled device comprises a verification unit arranged to transmit a challenge information to the remote control via the optical emitter, to receive a response information from the remote control via the communication channel for verification of the response and where the remote controlled device is further arranged to enter into pairing mode after a positive verification.

The verification of identity of the remote control allows the remote controlled devices to prevent unauthorized access to the remote controlled device if the response by the remote control to the challenge provided by the remote controlled device fails verification. By sending this challenge via the optical emitter of the remote controlled device and receiver of the remote control it becomes very difficult to obtain unauthorized access to the remote controlled device when having only access to the other communication channel.

DETAILED DESCRIPTION OF THE EMBODIMENTS

Figure 1:
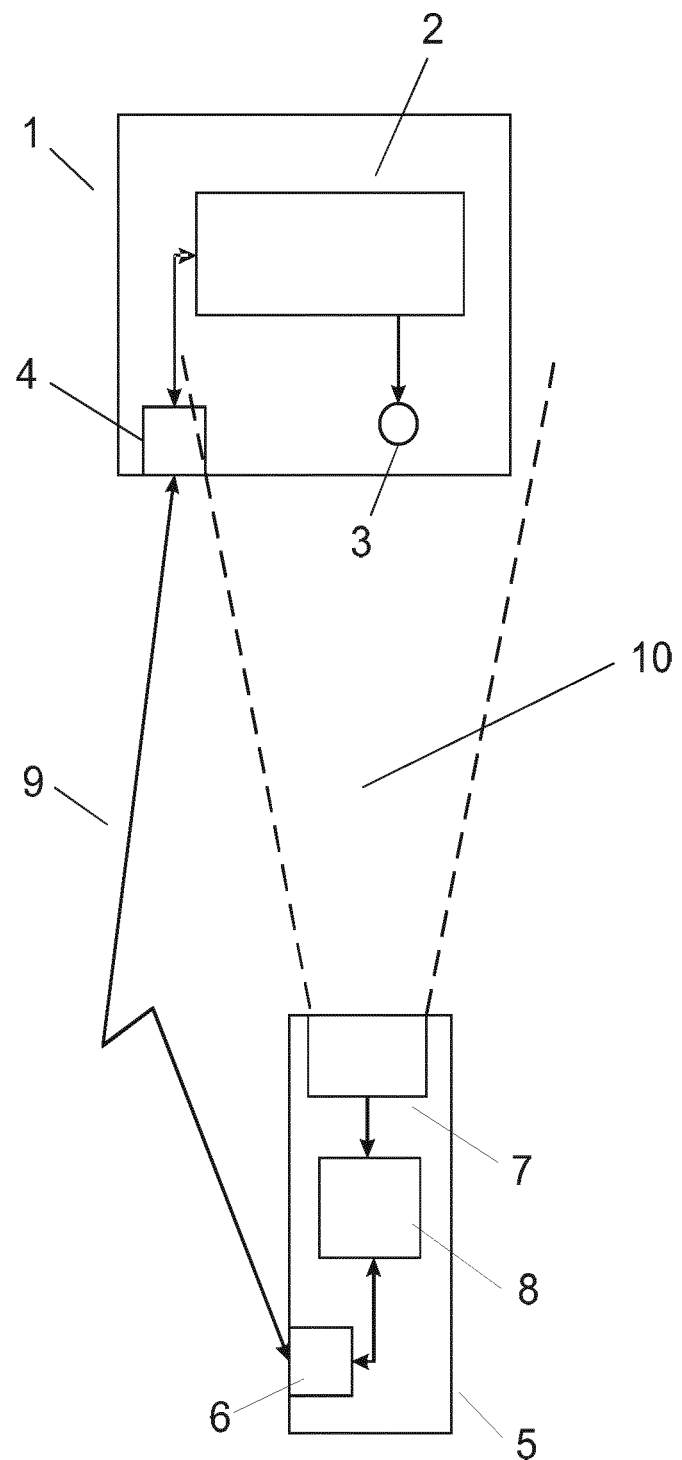
FIG. 1 shows a system according to the invention

FIG. 1 shows a system according to the invention.

The system comprises a remote controlled device 1 and a remote control 5. For explanation purposes a minimum system with just one remote control 5 and one remote controlled device 1 is shown. The remote controlled device 1 comprises a central processor 2, an optical emitter 3 and a communication interface 4. The remote control 5 comprises a communication interface 6, an optical detector land a processor 8. The remote controlled device 1 emits via modulation of the output of optical emitter 3 an optical signal. By modulating the optical signal the remote controlled device transmits a remote controlled device identifier, for instance the MAC address of its communication interface 4. This allows the remote controlled device 1 to be contacted by other devices via its communication interface 4 as the communication interface 4 can be identified within the network based on the MAC address of the communication interface 4. Because the optical emitter 3 is within the field of view of the optical detector 7 of the remote control 5 the remote control 5 can demodulate the received optical signal and extract the remote controlled device identification. If the remote controlled device identifier is the MAC address of the communication interface 4 of the remote controlled device 1 the processor 8 of the remote control 5 can contact the remote controlled device 1 via the communication channel 9 using the MAC address. Once the remote controlled device 1 has been contacted the remote control 5 and the remote controlled device 1 can perform a regular pairing procedure over the communication channel 9. Because the remote controlled device's MAC address is transmitted via an optical signal the user no longer has to press buttons to indicate which remote control has to be paired to which remote controlled device as the indication is now in the form of pointing the remote control 5 to the remote controlled device 1 so that the optical emitter 3 is within the field of view 10 of the optical detector 7 of the remote control. Optionally a single button press on the remote control 5 can be used to confirm the selection. After pairing the remote control 5 and remote controlled device 1 communicate through the communication channel 9 for instance for the transmission of commands from the remote control 5 to the remote controlled device 1. The optical signal emitted by the optical emitter 3 can be visible or non-visible, for instance infrared. The optical detector can be a simple photo transistor or photo diode based detector or a camera. In the case of a simple photo transistor or photo diode the optical signal is converted into an electrical signal which is then demodulated to obtain the remote controlled device identifier. In case of a camera the extraction of the remote controlled device identification is performed by analyzing a sequence of images using image processing.

Figure 2:
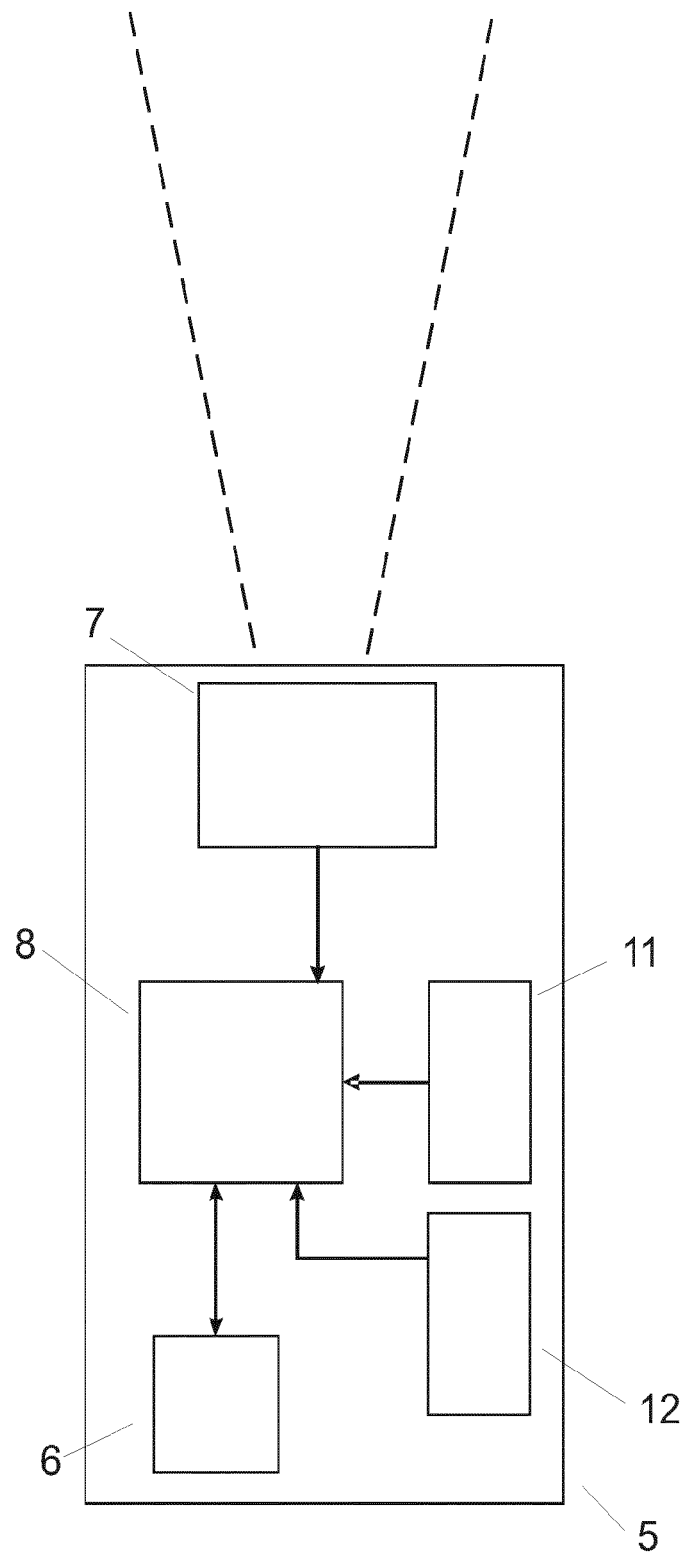
FIG. 2 shows a remote control.

FIG. 2 shows a remote control.

The remote control 5 comprises a processor 8, a camera or other optical detector 7, a communication interface 6 and a keyboard 11 and or a motion sensor 12. The camera/optical detector 7 is located at the front of the remote control so that when the user points the remote control 5 at an area, the area will be within the field of view of the camera/optical detector 7. Thus by pointing the remote control 5 for instance at an amplifier that can be remotely controlled the amplifier will be within the field of view of the camera/optical detector and thus an optical emitter mounted on the amplifier will also be within the field of view. Through a proper choice of the viewing angle of the camera/optical detector 7 the field of view can be chosen such that typically only a single optical emitter is within the field of view. This choice is more important for an optical detector in the form of a simple photo transistor or photo diode based detector as such a detector cannot easily distinguish between multiple optical emitter if they are all within the field of view. When using a camera multiple optical emitters of multiple remote controlled devices within the field of view can be handled by applying a rule as to which optical signal is to be selected for extraction of the remote controlled device identification. For instance, the optical signal from the optical emitter that is the most central in the field of view of the camera 7 can be chosen for further processing. Only the region around the chosen optical signal emitter is in that case used to derive the remote controlled device identification from the optical signal by processing a sequence of images captured by the camera 7.

The processor 8 receives a sequence of captured images from the camera 7, selects optical signal, defines an area around the chosen optical signal and processes the sequence of captured images by analyzing changes in the optical signal over time, i.e. over multiple captured images and translates these changes in the optical signal into the remote controlled device identification. The processor 8 then opens a communication channel via the communication interface 6 to the remote controlled device it was pointed at by addressing it using the retrieved remote controlled device identification. Once this communication channel is established the remote control 5 and the remote controlled device can perform a pairing process. The pairing of devices is well known from the art but in the art the devices have to discover each other's presence and addresses through the communication channel and the user would still have to indicate the device that he/she desires to have paired. As the presence and addressing is handled in the present invention through an optical path, which is a directional path, the user simply pointing the remote control at the remote controlled device to which he desires to pair the remote control results in an intuitive way of controlling the pairing.

To allow the entry of commands a keyboard 11 is coupled to the processor 8. Instead of performing the pairing completely automatically, a button press at the remote can also be used to initiate the pairing. In addition, or alternatively a motion sensor can be used for this purpose as remotes using gestures.

In order to clone the data from a first remote control to a second remote control the remote controls communicate via their communication interfaces. Once cloned the second remote control has all information to pair with the various remote controlled devices, or depending on the pairing mechanism, may be indistinguishable from the first remote control and as such function without any further pairing.

Figure 3:
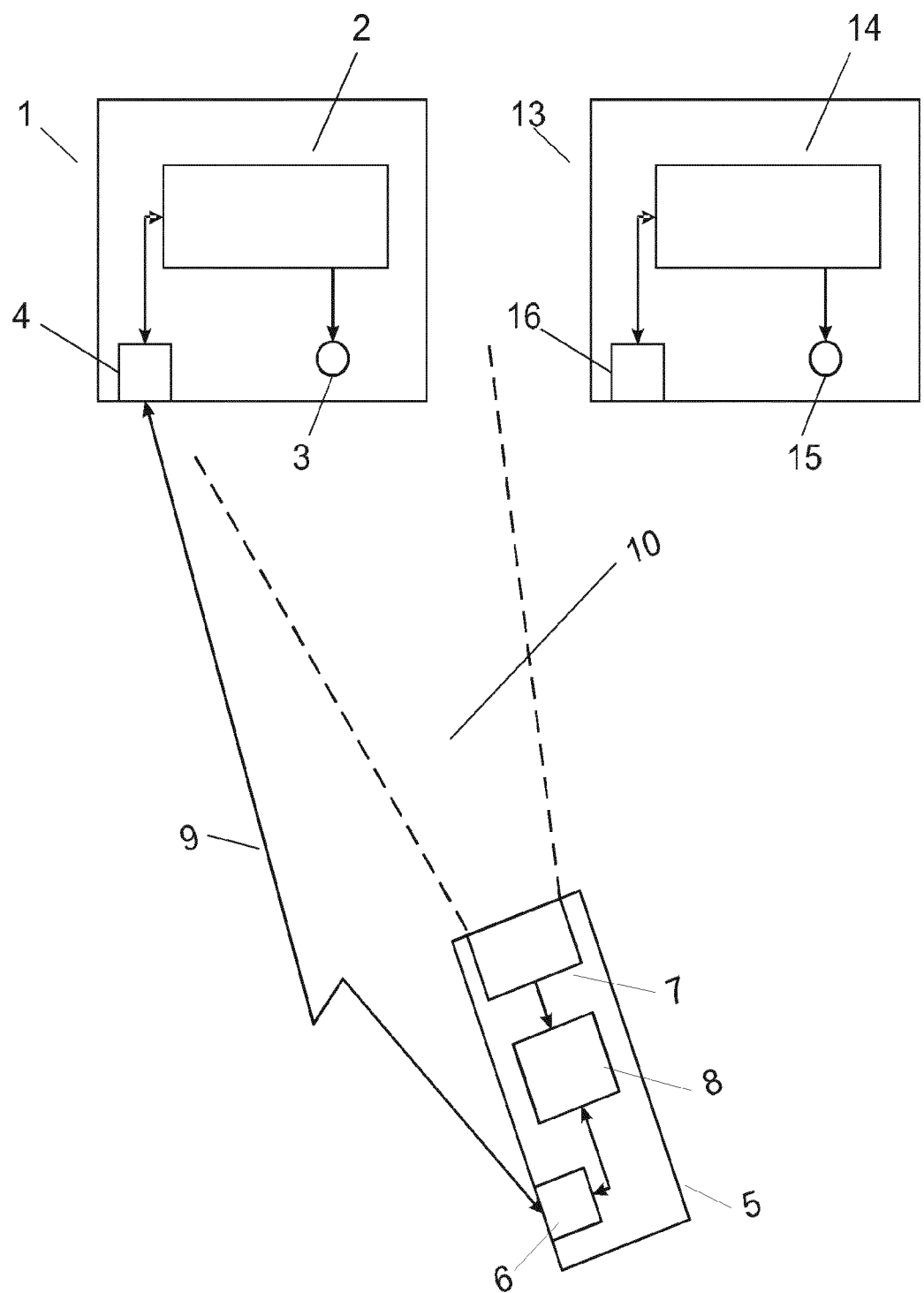
FIG. 3 shows a remote control with one of two remote controlled devices in the field of view.

FIG. 3 shows a remote control with one of two remote controlled devices in the field of view.

The mechanism of selecting the remote controlled device and pairing to it using a remote control with a narrow field of view are described based on FIG. 3.

A first remote controlled device 1 and a second remote controlled device 13 are available for pairing. The remote control 5 is pointed at the first remote controlled device 1. The optical emitter 3 of the first remote controlled device 1 is within the field of view 10 of the remote control 5. The optical detector 7 of the remote control 5 can thus observe the optical signal emitted by the optical emitter 3. The processor 8 of remote control 5 subsequently decodes the modulated signal to retrieve the remote controlled device identification. The remote controlled device identification allows the remote control to address the first remote controlled device 1 through the communication network and establish a communication channel 9 with the first remote controlled device 1 and execute the pairing process. As the optical emitter 15 of the second remote controlled device 13 is not within the field of view, even though it is adjacent to the first remote controlled device 1, the remote controlled device identification of the second remote controlled device 13 will not be received by the remote control 5. The limited viewing angle thus allows the selection to be unambiguous.

Figure 4:
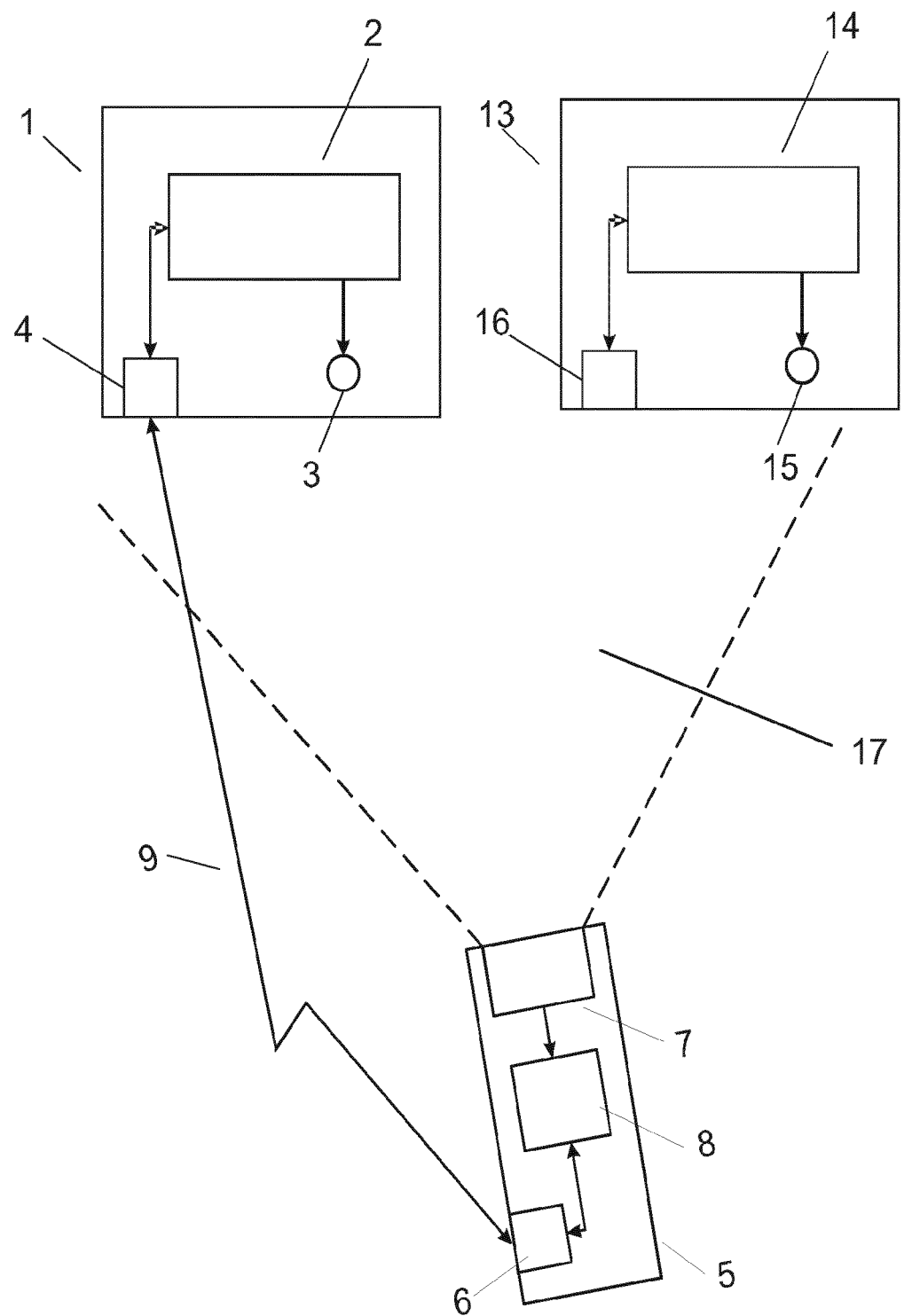
FIG. 4 shows a remote control with a wide field of view and two remote controlled devices in its field of view.

FIG. 4 shows a remote control with a wide field of view and two remote controlled devices in its field of view.

The mechanism of selecting the remote controlled device and pairing to it using a remote control with a wide field of view are described based on FIG. 3

A first remote controlled device 1 and a second remote controlled device 13 are available for pairing. The remote control 5 is pointed at the first remote controlled device 1. The optical emitter 3 of the first remote controlled device 1 and the optical emitter 15 of the second remote controlled device 13 are both within the field of view 17 of the remote control 5. The camera 7 of the remote control 5 can thus acquire both the optical signal emitted by the optical emitter 3 of the first remote controlled device 1 and the optical signal emitted by the optical emitter 15 of the second remote controlled device 13. The optical signal emitted by the optical emitter 3 of the first remote controlled device 1 is closest to the center of the image area of the camera 7 while the optical signal emitted by the optical emitter 15 of the second remote controlled device 13 is further from the center. The processor 8 of remote control 5 subsequently selects the optical signal that is closest to the center of the image area and uses the area in which the optical signal is present in a sequence of captured camera images to decode the modulated signal and thus retrieve the remote controlled device identification. The remote controlled device identification allows the remote control to address the first remote controlled device 1 through the communication network and establish a communication channel 9 with the first remote controlled device 1 and execute the pairing process. Even though the optical signal originating from the optical emitter 15 of the second remote controlled device 13 is within the field of view 17 it is not decoded as it was likely not the remote controlled device the user was pointing the remote control 5 at. This way the pairing can be reliably and intuitively be performed.

Figure 5:
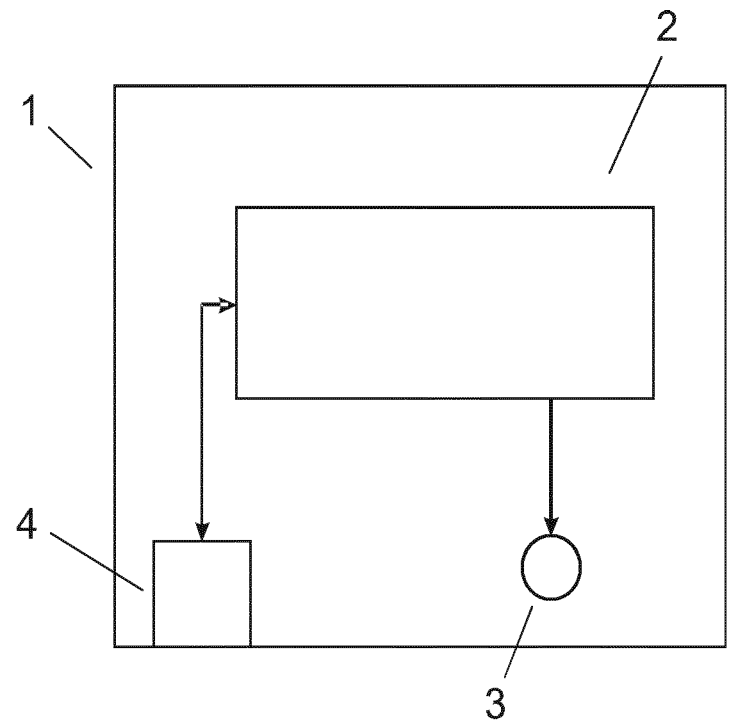
FIG. 5 shows a remote controlled device.

FIG. 5 shows a remote controlled device.

The remote controlled device 1 comprises a central processor 2, an optical emitter 3 and a communication interface 4. The processor 2 controls the optical emitter 3 and modulates the signal to the optical emitter 3 in such a way that the remote controlled device identification such as a MAC address is emitted in the form of an optical signal. As it is an optical signal the signal is directional and also restricted to the room in which the optical signal is emitted. This ensures that finding the MAC address for a remote control in the same room as the remote controlled device 1 is very easy and without interference from other remote controlled devices not in the room. If the same were attempted on a network, all devices in the network would be visible and a selection from a needlessly large list would have to be made. Restricting the selection physically to the room by using an optical signal greatly reduces the selection burden.

A remote control receiving the optical signal can contact the remote controlled device 1 via the communication channel 9 using the MAC address retrieved from the optical signal. For this the remote control uses the MAC address of the communication interface 4 of the remote controlled device 1. As it is a unique address it allows the unambiguous addressing of the remote controlled device. Once the remote controlled device 1 has been contacted the remote control 5 and the remote controlled device 1 can perform a regular pairing procedure over the communication channel 9 and once paired the remote control 5 can send commands to the remote controlled device 1.

Figure 6:
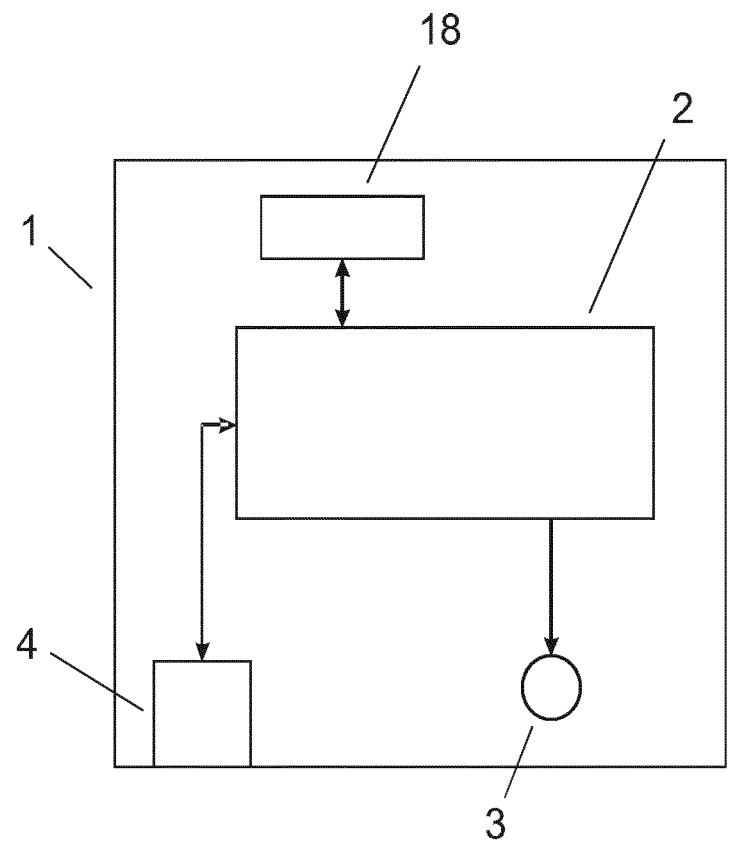
FIG. 6 shows remote controlled device comprising a verification unit.

FIG. 6 shows remote controlled device comprising a verification unit.

In addition to the remote controlled device 1 of FIG. 5 the remote controlled device of this embodiment additionally comprises a challenge & response database 18 coupled to the processor 2. The processor 2 controls the optical emitter 3 and modulates the signal to the optical emitter 3 in such a way that the remote controlled device identification such as a MAC address is emitted in the form of an optical signal. As it is an optical signal the signal is directional and also restricted to the room in which the optical signal is emitted. This ensures that finding the MAC address for a remote control in the same room as the remote controlled device 1 is very easy and without interference from other remote controlled devices not in the room. If the same were attempted on a network, all devices in the network would be visible and a selection from a needlessly large list would have to be made. Restricting the selection physically to the room by using an optical signal greatly reduces the selection burden.

A remote control receiving the optical signal can contact the remote controlled device 1 via the communication channel 9 using the MAC address retrieved from the optical signal. For this the remote control uses the MAC address of the communication interface 4 of the remote controlled device 1. As it is a unique address it allows the unambiguous addressing of the remote controlled device. Once the remote controlled device 1 has been contacted the remote controlled device 1 transmits a challenge, selected from the challenge and response memory 18, via the optical emitter to the remote control. The remote control receives this challenge and, using its processor, creates a response. The remote control transmits the response to the challenge via the communication channel 9 to the remote controlled device 1. The remote controlled device 1 receives the response via the communication interface 4 which provides the received response to the processor 2. The processor 2 compares the received response to the expected response of the selected and transmitted challenge. If the received response matches the expected response the pairing process is executed. If the received response does not match the expected response the pairing is denied.

The processor 2 together with the challenge and response memory 18 thus form a verification unit. This verification unit 2, 18 ensures that only authorized remote controls can be used to control the remote controlled device 1. The remote controls must not only be able to create the expected response but must also be pointed at the remote controlled device, i.e. hacking this system without access to the room in which the remote controlled device 1 is located is very difficult as the challenge can only be received optically with the optical emitter in the field of view of the remote control.

After passing the verification by the verification unit 2, 18 the remote control 5 and the remote controlled device 1 can perform a regular pairing procedure over the communication channel 9 and once paired the remote control 5 can send commands to the remote controlled device 1.

The invention claimed is:

1. A user interaction system comprising:
a remote controlled device comprising a communication interface, and an optical emitter;
a remote control comprising a communication interface, the remote control being arranged to transmit remote control data to the remote controlled device over a communication channel via the communication interface, the remote control further comprising an optical detector;
characterized in that
the remote controlled device is arranged to emit a remote controlled device identifier through the optical emitter;
the remote control is arranged to receive the remote controlled device identifier through the optical detector;
the remote control and/or remote controlled device are arranged to set up the communication channel using the remote controlled device identifier;
the remote controlled device further comprises a verification unit arranged to transmit a challenge information to the remote control via the optical emitter;
the remote control is arranged to enter into a pairing mode after receiving the challenge information via the optical detector and to transmit a response information back to the remote controlled device via the communication channel for verification of the response by the remote controlled device; and
the remote controlled device is further arranged to enter into pairing mode after a positive verification.

2. The user interaction system as claimed in claim 1, wherein within a set of remote controlled devices the remote controlled device identifier is a unique address, the unique address being preferably a MAC address.

3. The user interaction system as claimed in claim 1, wherein the remote control automatically initiates a pairing action to a remote controlled device that is both in view of the remote control's optical detector and is in pairing mode.

4. The user interaction system as claimed in claim 1, wherein the remote control automatically initiates a pairing action to a remote controlled device that is both in view of the remote control's optical detector and is unpaired.

5. The user interaction system as claimed in claim 1, wherein the system is arranged to pair a second remote control to the remote controlled device by initiating a clone process from a paired remote control to the second remote control.

6. The user interaction system as claimed in claim 5, wherein the remote controls are arranged to duplicate data changes in a first remote control to a second remote control.

7. A remote control comprising a communication interface, the remote control being arranged to transmit remote control data to a remote controlled device over a communication channel via the communication interface, the remote control further comprising an optical detector, characterized in that the remote control is arranged to:
receive a remote controlled device identifier from the remote controlled device through the optical detector;
set up the communication channel using the remote controlled device identifier;
enter into a pairing mode after receiving a challenge information via the optical detector, and transmit a response information back to the remote controlled device via the communication channel for verification of the response by the remote controlled device; and
pair with the remote controlled device after a positive verification of the response by the remote controlled device.

8. The remote control as claimed in claim 7, wherein within a set of remote controlled devices the remote controlled device identifier is a unique address, the unique address being preferably a MAC address.

9. The remote control as claimed in claim 7, wherein the remote control automatically initiates a pairing action to a remote controlled device that is both in view of the remote control's optical detector and is in pairing mode.

10. The remote control as claimed in claim 7, where the remote control automatically initiates a pairing action to a remote controlled device that is both in view of the remote control's optical detector and is unpaired.

11. The remote control as claimed in claim 7, where the remote control is arranged to initiate a clone process from the remote control to a second remote control.

12. The remote control as claimed in claim 11, where the remote controls are arranged to duplicate data changes in the remote control to a second remote control.

13. A remote controlled device comprising a communication interface, and an optical emitter, the remote controlled device being arranged to be controlled by remote control data transmitted by a remote control to the remote controlled device to the communication interface over a communication channel, the remote control further comprising an optical detector;
characterized in that
the remote controlled device is arranged to emit a remote controlled device identifier through the optical emitter to the remote control to enable the remote control to set up the communication channel using the remote controlled device identifier;
in that the remote controlled device comprises a verification unit arranged to transmit a challenge information to the remote control via the optical emitter, to receive a response information from the remote control via the communication channel for verification of the response; and
in that the remote controlled device is further arranged to enter into pairing mode after a positive verification.

14. The remote controlled device as claimed in claim 13, wherein within a set of remote controlled devices the remote controlled device identifier is a unique address, the unique address being preferably a MAC address.

15. The remote controlled device as claimed in claim 13, wherein the remote controlled device is arranged to enter pairing mode when emitting the remote controlled device identifier.

* * * * *